(12) United States Patent
Kasahara et al.

(10) Patent No.: US 11,799,098 B2
(45) Date of Patent: Oct. 24, 2023

(54) FUEL CELL SYSTEM

(71) Applicant: TOYOTA JIDOSHA KABUSHIKI KAISHA, Toyota (JP)

(72) Inventors: Yuuki Kasahara, Susono (JP); Masayuki Ito, Shizuoka-ken (JP); Satoshi Andoh, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/654,119

(22) Filed: Mar. 9, 2022

(65) Prior Publication Data
US 2022/0293974 A1    Sep. 15, 2022

(30) Foreign Application Priority Data

Mar. 10, 2021 (JP) ................. 2021-038186

(51) Int. Cl.
| | | |
|---|---|---|
| *H01M 8/04089* | (2016.01) | |
| *H01M 8/04537* | (2016.01) | |
| *H01M 8/04746* | (2016.01) | |
| *H01M 8/0438* | (2016.01) | |
| *H01M 8/04082* | (2016.01) | |

(52) U.S. Cl.
CPC ... *H01M 8/04097* (2013.01); *H01M 8/04201* (2013.01); *H01M 8/04388* (2013.01); *H01M 8/04582* (2013.01); *H01M 8/04753* (2013.01)

(58) Field of Classification Search
CPC ......... H01M 8/04097; H01M 8/04201; H01M 8/04388; H01M 8/04582; H01M 8/04753; H01M 8/04402; H01M 8/04589; H01M 8/04156; H01M 8/04179
See application file for complete search history.

(56) References Cited

U.S. PATENT DOCUMENTS

| | | | |
|---|---|---|---|
| 2014/0147760 A1* | 5/2014 | Ohgami | H01M 8/04753 429/415 |
| 2019/0296376 A1 | 9/2019 | Mizumoto et al. | |
| 2020/0243879 A1 | 7/2020 | Tanaka | |

FOREIGN PATENT DOCUMENTS

| | | |
|---|---|---|
| JP | 2011179333 A | 9/2011 |
| JP | 2014123555 A | 7/2014 |
| JP | 2019169264 A | 10/2019 |
| JP | 2020123458 A | 8/2020 |

* cited by examiner

*Primary Examiner* — Stewart A Fraser
(74) *Attorney, Agent, or Firm* — Dickinson Wright, PLLC

(57) ABSTRACT

To provide a fuel cell system configured to suppress the occurrence of partial fuel gas deficiency in a fuel cell. A fuel cell system wherein at least one injector selected from the group consisting of a first injector and a second injector is driven by duty ratio control to maintain a fuel gas pressure to the fuel cell within a predetermined range, in accordance with an output current value; wherein a controller determines whether or not the output current value is larger than a predetermined first threshold; and wherein, when the controller determines that the output current value is larger than the predetermined first threshold, the controller drives the first injector by duty ratio control, and the controller drives the second injector by duty ratio control to open a valve of the second injector at least while a valve of the first injector is closed.

2 Claims, 3 Drawing Sheets

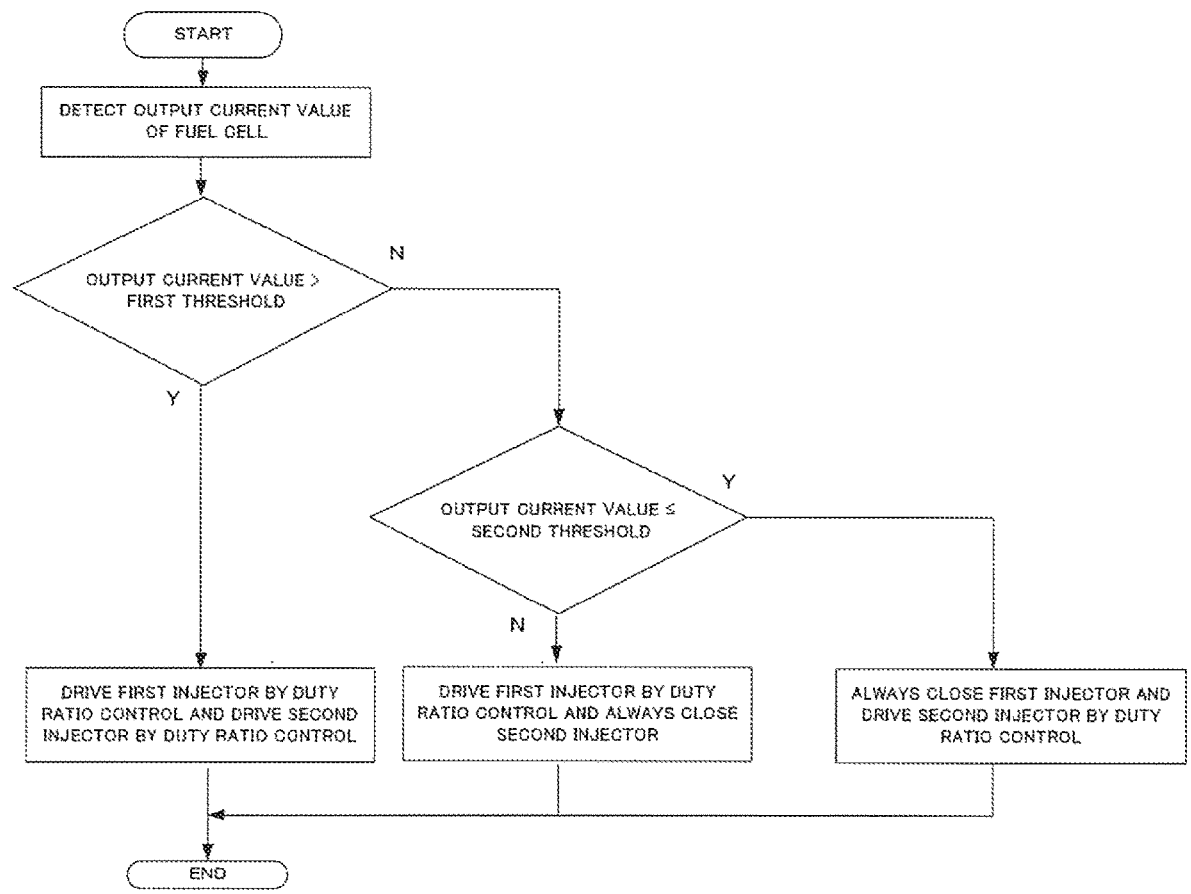

FUEL CELL SYSTEM

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be referred to as "stack") composed of stacked unit fuel cells (hereinafter may be referred to as "cell"). In many cases, the fuel gas and oxidant gas actually supplied to the fuel cell, are mixtures with gases that do not contribute to oxidation and reduction. Especially, the oxidant gas is often air containing oxygen.

Hereinafter fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle").

For example, Patent Literature 1 discloses a fuel cell system for improving the circulation capacity of a fuel circulation system that circulates anode off-gas discharged from a fuel cell stack.

Patent Literature 2 discloses a fuel cell system in which deterioration of power generation performance of a fuel cell is suppressed.

Patent Literature 3 discloses a fuel cell system that is capable of stably circulating fuel-off gas to a fuel cell by simple control and that is capable of, depending on the circumstances, enhancing the water drainage efficiency of the fuel cell and reducing noise and vibrations during the operation of injectors.

Patent Literature 4 discloses a fuel cell system which can properly supply fuel gas.

Patent Literature 1: Japanese Patent Application Laid-Open (JP-A) No. 2011-179333
Patent Literature 2: JP-A No. 2020-123458
Patent Literature 3: JP-A No. 2019-169264
Patent Literature 4: JP-A No. 2014-123555

In the fuel gas system of a fuel cell system, it is important to enhance the circulation performance of the fuel circulation device which circulates fuel off-gas discharged from the fuel cell.

When the power generation amount of the fuel cell is large, the pressure within the circulation flow path is rapidly decreased while the valve of the injector is closed. Due to the influence of variations in the pressure value detected by the pressure sensor, signal transmission delay and so on, the pressure within the circulation flow path falls below the lower limit of a preset pressure range. As a result, there is a possibility of hydrogen deficiency in the fuel cell and deterioration of the catalyst of the fuel cell.

In the above-described configuration of Patent Literature 1, the first injector and the second injector alternately inject the fuel, and the amounts of the fuels injected by the injectors are the same. In high-load power generation of the fuel cell, the pressure within the circulation flow path rapidly decreases while the injector is stopped, and the configuration of Patent Literature 1 cannot solve the problem. Accordingly, there is a possibility that partial fuel gas deficiency occurs in the fuel cell, and the catalyst of the fuel cell is deteriorated.

SUMMARY

An object of the present disclosure is to provide a fuel cell system configured to suppress the occurrence of partial fuel gas deficiency in a fuel cell.

In a first embodiment, there is provided a fuel cell system, wherein the fuel cell system comprises:
a fuel cell,
a current sensor for detecting an output current value of the fuel cell,
a fuel gas supplier for supplying fuel gas to the fuel cell,
a circulation flow path connecting a fuel gas outlet of the fuel cell and a fuel gas inlet of the fuel cell to allow fuel off-gas discharged from the fuel gas outlet of the fuel cell to be returned to the fuel gas inlet of the fuel cell as circulation gas and circulated,
an ejector disposed in the circulation flow path,
a fuel gas supply flow path connecting the fuel gas supplier and the ejector,
an injector set disposed upstream from the ejector of the fuel gas supply flow path,
a gas-liquid separator disposed upstream from the ejector of the circulation flow path,
a fuel off-gas discharge flow path branching from the gas-liquid separator of the circulation flow path to allow the fuel off-gas to be discharged to the outside of the fuel cell system,
a pressure sensor disposed in the circulation flow path, and
a controller,
wherein the injector set includes a first injector and a second injector in parallel;
wherein an injected fuel gas amount per unit time of the second injector is smaller than that of the first injector;
wherein at least one injector selected from the group consisting of the first injector and the second injector is driven by duty ratio control to maintain a fuel gas pressure to the fuel cell within a predetermined range, in accordance with the output current value;

wherein the controller determines whether or not the output current value is larger than a predetermined first threshold; and wherein, when the controller determines that the output current value is larger than the predetermined first threshold, the controller drives the first injector by duty ratio control, and the controller drives the second injector by duty ratio control to open a valve of the second injector at least while a valve of the first injector is closed.

When the controller determines that the output current value is larger than the predetermined first threshold, the controller may drive the first injector by duty ratio control, and the controller may drive the second injector by duty ratio control to open the valve the second injector after closing the valve of the first injector and to close the valve of the second injector after opening the valve of the first injector.

When the controller determines that the output current value is larger than the predetermined first threshold, the controller may drive the first injector by duty ratio control, and the controller may control the valve of the second injector to be always opened.

When the controller determines that the output current value is equal to or less than the predetermined first threshold, the controller may determine whether or not the output current value is equal to or less than the predetermined second threshold, which is smaller than the predetermined first threshold.

When the controller determines that the output current value is equal to or less than the predetermined second threshold, the controller may always close the valve of the first injector and may drive the second injector by duty ratio control.

When the controller determines that the output current value is larger than the predetermined second threshold, the controller may always close the valve of the second injector and may drive the first injector by duty ratio control.

According to the fuel cell system of the present disclosure, the occurrence of partial fuel gas deficiency in the fuel cell is suppressed.

BRIEF DESCRIPTION OF THE DRAWINGS

In the accompanying drawings,

FIG. 7 is a flowchart illustrating an example of the control of the fuel cell system of the present disclosure.

DETAILED DESCRIPTION

Figure 1:
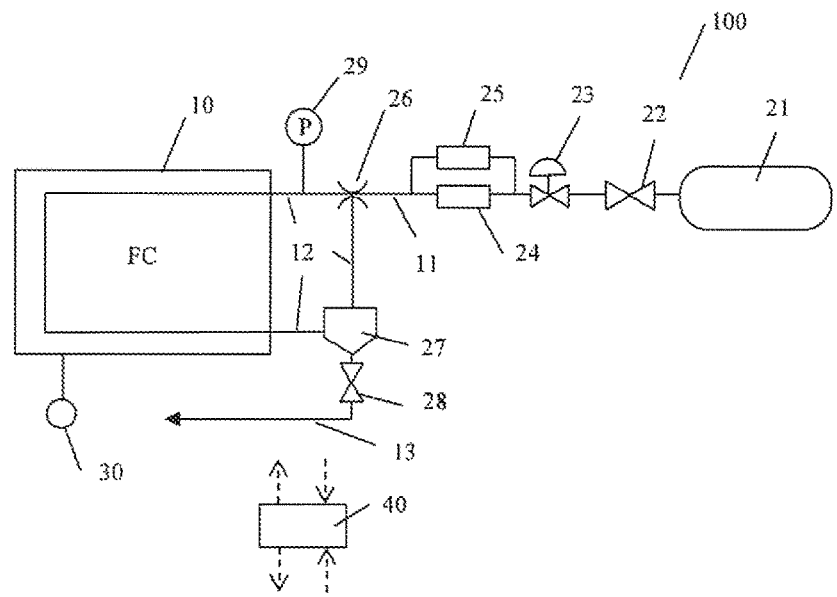
FIG. 1 is a schematic configuration diagram of an example of the fuel cell system of the present disclosure.

The fuel cell system of the present disclosure is a fuel cell system, wherein the fuel cell system comprises:

a fuel cell, a current sensor for detecting an output current value of the fuel cell, a fuel gas supplier for supplying fuel gas to the fuel cell, a circulation flow path connecting a fuel gas outlet of the fuel cell and a fuel gas inlet of the fuel cell to allow fuel off-gas discharged from the fuel gas outlet of the fuel cell to be returned to the fuel gas inlet of the fuel cell as circulation gas and circulated, an ejector disposed in the circulation flow path, a fuel gas supply flow path connecting the fuel gas supplier and the ejector, an injector set disposed upstream from the ejector of the fuel gas supply flow path, a gas-liquid separator disposed upstream from the ejector of the circulation flow path, a fuel off-gas discharge flow path branching from the gas-liquid separator of the circulation flow path to allow the fuel off-gas to be discharged to the outside of the fuel cell system, a pressure sensor disposed in the circulation flow path, and a controller, wherein the injector set includes a first injector and a second injector in parallel;

wherein an injected fuel gas amount per unit time of the second injector is smaller than that of the first injector;

wherein at least one injector selected from the group consisting of the first injector and the second injector is driven by duty ratio control to maintain a fuel gas pressure to the fuel cell within a predetermined range, in accordance with the output current value;

wherein the controller determines whether or not the output current value is larger than a predetermined first threshold; and wherein, when the controller determines that the output current value is larger than the predetermined first threshold, the controller drives the first injector by duty ratio control, and the controller drives the second injector by duty ratio control to open a valve the second injector at least while a valve the first injector is closed.

In the fuel cell system which includes the first injector, the second injector and the circulation flow path as the fuel gas system and in which the injected fuel gas amount per unit time of the second injector is smaller than that of the first injector, the power generation amount of the fuel cell is large, and there is a possibility that the pressure of the circulation flow path rapidly decreases while the first injector is stopped, and partial fuel gas deficiency occurs. According to the present disclosure, when (1) the power generation amount of the fuel cell is large, (2) the valve of the first injector is closed, and (3) a decrease in the pressure within the circulation flow path is large, the second injector is used to slow down the pressure decrease within the circulation flow passage. That is, while the first injector is stopped, the fuel gas is injected from the second injector to suppress the rapid pressure decrease of the circulation flow path. According to the disclosed, even when the pressure within the circulation flow path rapidly decreases, the pressure within the circulation flow path is less likely to fall below the lower limit of the preset pressure range. As a result, the occurrence of fuel gas deficiency in the fuel cell and the deterioration of the catalyst of the fuel cell are suppressed.

FIG. 1 is a schematic configuration diagram of an example of the fuel cell system of the present disclosure.

A fuel cell system 100 shown in FIG. 1 includes a fuel cell 10; moreover, as the fuel gas system, the fuel cell system 100 includes a fuel gas supply flow path 11, a circulation flow path 12, a fuel off-gas discharge flow path 13, a fuel gas supplier 21, a main shutoff valve 22, a pressure control valve 23, a first injector 24, a second injector 25, an ejector 26, a gas-liquid separator 27, a vent and discharge valve 28, a pressure sensor 29, a current sensor 30 and a controller 40. In FIG. 1, only the fuel gas system is illustrated, and other systems such as the oxidant gas system and the cooling system are not illustrated.

The pressure sensor 29 detects the pressure of the fuel gas. The pressure sensor 29 is electrically connected to the controller 40 and sends the detected fuel gas pressure to the controller 40.

The current sensor 30 detects the output current value of the fuel cell. The current sensor 30 is electrically connected to the controller 40 and sends the detected output current value of the fuel cell to the controller 40.

The pressure control valve 23 is electrically connected to the controller 40, and it reduces the pressure applied to the first injector 24 and the second injector 25 to be about 1 MPa, for example.

The gas-liquid separator 27 is disposed at the branch point of the circulation flow path 12 into the fuel off-gas discharge flow path 13. It separates the fuel gas and water from the fuel off-gas, which is the fuel gas discharged from the anode outlet, and returns the fuel gas to the circulation flow path 12 as the circulation gas.

The controller 40 is electrically connected to the vend and discharge valve 28. As needed, it opens the vent and discharge valve 28 to discharge unnecessary gas, water and the like from the fuel off-gas discharge flow path 13 to the outside.

The ejector 26 is disposed at the junction of the circulation flow path 12 with the fuel gas supply flow path 11.

The first injector 24 and the second injector 25 are disposed upstream from the ejector 26 of the fuel gas supply flow path 11.

The controller 50 is electrically connected to the first injector 24 and the second injector 25. In accordance with the output current value of the fuel cell 10, the controller 50 switches the driving/stopping of the first injector 24 and the second injector 25. The injected fuel gas amount per unit time of the second injector 25 is smaller than that of the first injector 24.

When the output current value of the fuel cell 10 is small, the controller 50 allows the fuel gas to be supplied from only the second injector 25. When the output current value is moderate, the controller 50 allows the fuel gas to be supplied from only the first injector 24. When the output current value is large, the controller 50 allows the fuel gas to be supplied from both the first injector 24 and the second injector 25.

In FIG. 1, the fuel off-gas not used in the fuel cell 10 is recirculated by the ejector 26. Instead of the ejector 26, the fuel cell system 100 may include a circulation pump. The fuel cell system 100 may include the circulation pump upstream from the ejector 26 of the circulation flow path 12.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

In general, the fuel cell system of the present disclosure is installed and used in a vehicle including a motor as a driving source.

The fuel cell system of the present disclosure may be installed and used in a vehicle that can be run by the power of a secondary cell.

The motor is not particularly limited, and it may be a conventionally-known driving motor.

The vehicle may be a fuel cell electric vehicle.

The vehicle may include the fuel cell system of the present disclosure.

The fuel cell system of the present disclosure includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 300 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum, (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system includes, as the fuel gas system of the fuel cell, the fuel gas supplier, the fuel gas supply flow path, the circulation flow path, the ejector, the injector set, the gas-liquid separator, the fuel off-gas discharge flow path, the controller, the current sensor and the pressure sensor.

The fuel gas supplier supplies the fuel gas to the fuel cell. More specifically, the fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The circulation flow path connects the fuel gas outlet of the fuel gas and the fuel gas inlet of the fuel gas.

The circulation flow path allows the fuel off-gas, which is the fuel gas discharged from the fuel gas outlet of the fuel cell, to be returned to the fuel gas inlet of the fuel gas as the circulation gas and to be circulated. The fuel gas inlet may be the fuel gas supply hole, the anode inlet manifold or the like.

In the circulation flow path, the ejector is disposed.

For example, the ejector may be disposed at a junction with the fuel gas supply flow path on the circulation flow path. The ejector supplies a mixed gas containing the fuel gas and circulation gas to the anode of the fuel cell. As the ejector, a conventionally-known ejector may be used.

The circulation pump may be disposed upstream from the ejector of the circulation flow path. In place of the ejector, the circulation pump may be disposed at the junction with the fuel gas supply flow path of the circulation flow path. The circulation pump may provide an impetus to circulate the fuel off-gas as the circulation gas. The circulation pump may be electrically connected to the controller, and the flow rate of the circulation gas may be controlled by controlling the turning on/off, rotational frequency, etc., of the circulation pump by the controller.

The fuel gas supply flow path connects the ejector and the fuel gas supplier. The fuel gas supply flow path allows the fuel gas to be supplied to the ejector.

The injector set is disposed upstream from the ejector of the fuel gas supply flow path.

The injector set includes the first injector and the second injector in parallel.

The injected fuel gas amount per unit time of the second injector is smaller than that of the first injector. As the first injector and the second injector, conventionally known injectors can be appropriately employed.

The pressure control valve may be disposed upstream from the injector set of the fuel gas supply flow path. The pressure control valve is electrically connected to the controller to reduce the pressure applied to the first injector and the second injector.

The gas-liquid separator (anode gas-liquid separator) is disposed upstream from the ejector of the circulation flow path.

The gas-liquid separator may be disposed at the branch point of the fuel off-gas discharge flow path and the circulation flow path.

The gas-liquid separator may be disposed upstream from the vent and discharge valve of the fuel off-gas discharge flow path.

The gas-liquid separator separates the water and fuel gas contained in the fuel off-gas, which is the fuel gas discharged from the fuel gas outlet. Accordingly, the fuel gas may be returned to the circulation flow path as the circulation gas, or unnecessary gas, water and the like may be discharged to the outside by opening the vent and discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The fuel off-gas discharge flow path branches from the circulation flow path through the gas-liquid separator.

The fuel off-gas discharge flow path allows the fuel off-gas discharged from the fuel gas outlet of the fuel cell to be discharged to the outside of the fuel cell system. The fuel gas outlet may be the fuel gas discharge hole, the anode outlet manifold, or the like.

The vent and discharge valve (the fuel off-gas discharge valve) may be disposed in the fuel off-gas discharge flow path. The vent and discharge valve is disposed downstream from the gas-liquid separator in the fuel off-gas discharge flow path.

The vent and discharge valve allows the fuel off-gas, water and the like to be discharged to the outside (of the system). The outside may be the outside of the fuel cell system, or it may be the outside of the vehicle.

The vent and discharge valve may be electrically connected to the controller, and the flow rate of the fuel off-gas discharged to the outside may be controlled by controlling the opening and closing of the vent and discharge valve by the controller. By controlling the opening degree of the vent and discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The current sensor detects the output current value of the fuel cell. The current sensor is electrically connected to the controller to send the detected output current value of the fuel cell to the controller.

As the current sensor, a conventionally-known ammeter or the like may be used.

The pressure sensor is disposed in the circulation flow path. From the viewpoint of increasing detection accuracy, the pressure sensor may be disposed in a region between the ejector and the fuel cell, which is downstream from the ejector of the circulation flow path.

The pressure sensor detects the pressure of the fuel gas. The pressure sensor is electrically connected to the controller and sends the detected pressure of the fuel gas to the controller.

As the pressure sensor, a conventionally-known pressure meter or the like may be used.

As the oxidant gas system of the fuel cell, the fuel cell system may include an oxidant gas supplier, an oxidant gas supply flow path, and an oxidant off-gas discharge flow path.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The fuel cell system may include a refrigerant supplier and a refrigerant circulation flow path as the cooling system of the fuel cell.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is driven according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

In accordance with the output current value, the duty ratio of at least one injector selected from the group consisting of the first injector and the second injector, is controlled to maintain the fuel gas pressure to the fuel cell within the predetermined range.

The controller determines whether or not the output current value is larger than the predetermined first threshold.

When the controller determines that the output current value is larger than the predetermined first threshold, the controller drives the first injector by duty ratio control, and the controller drives the second injector by duty ratio control to open the valve the second injector at least while the valve of the first injector is closed.

In the periodic control of opening and closing the injector valve, a time period that begins when the injector valve is opened and ends when the injector valve is closed and then opened again, is determined as one period. The duty ratio of the injector means the ratio of a time period in which the valve is opened with respect to the time of the one period.

In the present disclosure, the duty ratio control means that the duty ratio is controlled to be a value of more than 0% and less than 100%. When the duty ratio is 0%, it is a state such that the duty ratio is not controlled since there is no drive command from the controller and the injector valve is closed. When the duty ratio is 100%, it is a state such that the duty ratio is not controlled since the injector valve is always opened and is driven. The controlled duty ratio is not particularly limited and is appropriately determined according to the output current value, as long as the fuel gas pressure to the fuel cell is maintained within the predetermined range and is more than 0% and less than 100%. By monitoring the value of the fuel gas pressure detected by the pressure sensor, the controller can control the duty ratio so that the fuel gas pressure is maintained within the predetermined range.

The predetermined first threshold of the output current value may be, for example, the output current value of the fuel cell during the power generation of the fuel cell at a high load current. The specific output current value may be appropriately determined according to the performance of the fuel cell.

Based on an empirical rule, the lower limit of the fuel gas pressure within the predetermined range may be appropriately set to a pressure at which partial fuel gas deficiency is less likely to occur. Based on an empirical rule, the upper limit of the fuel gas pressure within the predetermined range may be appropriately set to a pressure at which deterioration of the electrolyte membrane is less likely to occur.

When the controller determines that the output current value is larger than the predetermined first threshold, as a first embodiment, the controller may drive the first injector by duty ratio control, and the controller may drive the second injector by duty ratio control to open the valve the second injector concurrently with closing the valve of the first injector and to close the valve of the second injector concurrently with opening the valve of the first injector.

When the controller determines that the output current value is larger than the predetermined first threshold, as a second embodiment, the controller may drive the first injector by duty ratio control, and the controller may drive the second injector by duty ratio control to open the valve of the second injector after closing the valve of the first injector and to close the valve of the second injector after opening the valve of the first injector.

When the controller determines that the output current value is larger than the predetermined first threshold, as a third embodiment, the controller may drive the first injector by duty ratio control, and the controller may control the valve of the second injector to be always opened (duty ratio 100%).

When the controller determines that the output current value is equal to or less than the predetermined first threshold, the controller determines whether or not the output current value is equal to or less than the predetermined second threshold, which is smaller than the predetermined first threshold.

When the controller determines that the output current value is equal to or less than the predetermined second threshold, the controller may always close the valve of the first injector, and the controller may drive the second injector by duty ratio control. Accordingly, the fuel efficiency is increased.

On the other hand, when the controller determines that the output current value is larger than the predetermined second threshold, the controller may always close the valve of the second injector, and the controller may drive the first injector by duty ratio control. Accordingly, the fuel gas may be supplied to the fuel cell only by the first injector during, for example, the normal operation of the fuel cell.

The predetermined second threshold of the output current value may be, for example, the output current value of the fuel cell during the power operation of the fuel cell at a medium load current. The specific output current value may be appropriately determined according to the performance of the fuel cell. That is, during the power generation of the fuel cell at a medium load current, the second injector is stopped (the valve of the second injector is always closed, duty ratio 0%), and the fuel gas is periodically injected from the first injector (duty ratio control). During the power generation of the fuel cell at a current less than the medium load current, the first injector is stopped (the valve of the first injector is always closed, duty ratio 0%) and the fuel gas is periodically injected from the second injector (duty ratio control).

Figure 2:
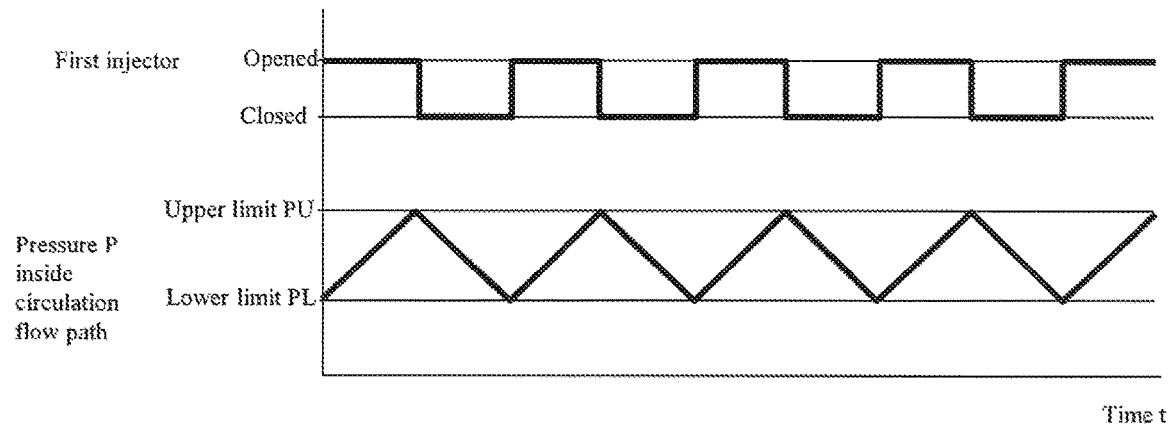
FIG. 2 is a diagram illustrating an example of the relationship between the valve opening/closing state of the first injector and the pressure P inside the circulation flow path during the power generation of the fuel cell at a constant medium load current.

FIG. 2 is a diagram illustrating an example of the relationship between the valve opening/closing state of the first injector and the pressure P inside the circulation flow path during the power generation of the fuel cell at a constant medium load current.

Since the power generation of the fuel cell is conducted at a constant load current, a certain amount of fuel gas is consumed per unit time in the fuel cell. When the pressure P inside the circulation flow path reaches the lower limit PL, the controller (ECU) opens the valve of the first injector. The amount of the fuel gas injected by the first injector when the valve of the first injector is opened, is larger than the amount of the fuel gas consumed by the fuel cell. Accordingly, while the valve of the first injector is opened, the pressure P inside the circulation flow path increases. When the pressure P inside the circulation flow path reaches the upper limit PU, the ECU closes the valve of the first injector. While the valve of the first injector is closed, the pressure P inside the circulation flow path decreases because the fuel gas is consumed by the power generation of the fuel cell. By repeating this process, the pressure P inside the circulation flow path is maintained within the range of from the lower limit PL or more to the upper limit PU or less.

Figure 3:
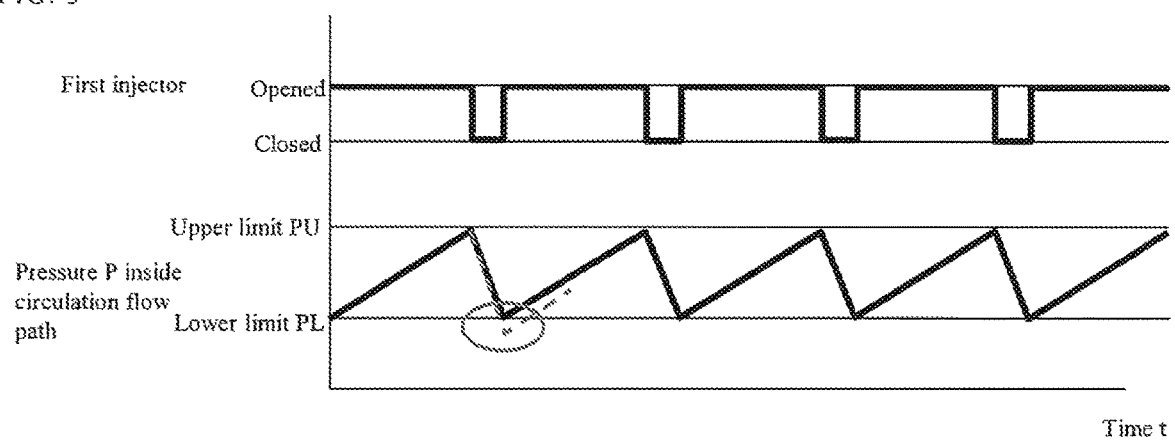
FIG. 3 is a diagram illustrating an example of the relationship between the valve opening/closing state of the first injector and the pressure P inside the circulation flow path during the power generation of the fuel cell of the prior art at a constant high load current.

FIG. 3 is a diagram illustrating an example of the relationship between the valve opening/closing state of the first injector and the pressure P inside the circulation flow path during the power generation of the fuel cell of the prior art at a constant high load current.

Since the power generation of the fuel cell is conducted at a constant high load current, the amount of the fuel gas consumed in the fuel cell per unit time is larger than that at a medium load. On the other hand, the first injector controls the injected fuel gas amount by the valve opening time, and the amount of the injected fuel gas per unit time while the injection valve is opened, is constant. Accordingly, the gradient of the pressure rise while the valve of the first injector is opened, is decreased, and the gradient of the pressure drop while the valve of the first injector is closed, is increased.

The valve of the first injector is opened again when the pressure P inside the circulation flow path reaches the lower limit PL. When the gradient of the pressure drop is large, the pressure P inside the circulation flow path is likely to fall below the lower limit PL, due a delay in the response of the first injector, a delay in the signal of the pressure sensor, variations in the detected values, and so on.

First Embodiment

Figure 4:
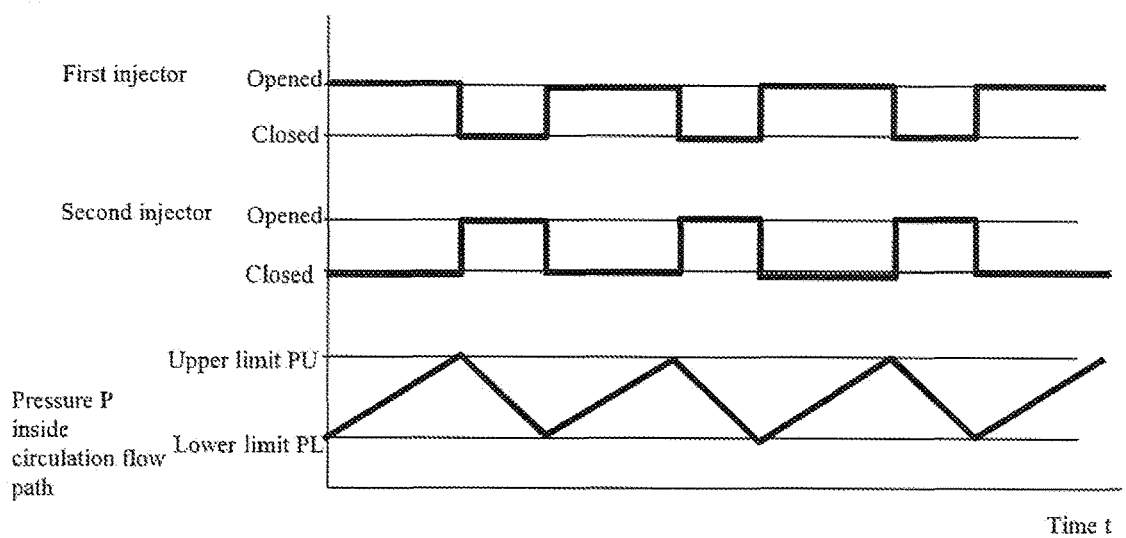
FIG. 4 is a diagram illustrating an example of the relationship between the valve opening/closing state of the first injector, the valve opening/closing state of the second injector, and the pressure P inside the circulation flow path during the power generation of the fuel cell of the present disclosure at a constant high load current.

FIG. 4 is a diagram illustrating an example of the relationship between the valve opening/closing state of the first injector, the valve opening/closing state of the second injector, and the pressure P inside the circulation flow path during the power generation of the fuel cell of the present disclosure at a constant high load current.

In the first embodiment of the present disclosure, the valve of the second injector is opened while the valve of the first injector is closed, thereby supplying the fuel gas to the fuel cell. Accordingly, the gradient of the pressure drop while the valve of the first injector is closed, is reduced.

The injected fuel gas amount per unit time of the second injector, is smaller than the amount of the fuel consumed by the fuel cell at a high load. Accordingly, even during the period of time in which the valve of the second injector is opened to inject the fuel gas, the pressure P inside the circulation flow path gradually decreases. That is, the pressure decrease rate while the valve of the first injector is closed, is gentle compared to the comparative example shown in FIG. 3.

Accordingly, the pressure within the circulation flow path is less likely to fall below the lower limit PL, and the occurrence of partial fuel gas deficiency and the deterioration of the catalyst inside the fuel cell are suppressed.

Second Embodiment

Figure 5:
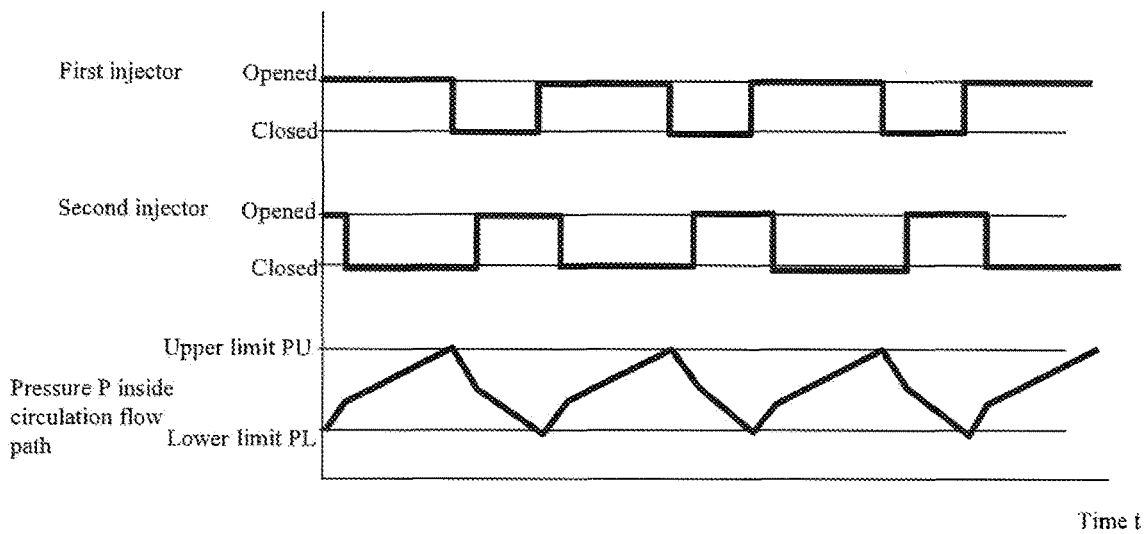
FIG. 5 is a diagram illustrating another example of the relationship between the valve opening/closing state of the first injector, the valve opening/closing state of the second injector, and the pressure P inside the circulation flow path during the power generation of the fuel cell of the present disclosure at a constant high load current.

FIG. 5 is a diagram illustrating another example of the relationship between the valve opening/closing state of the first injector, the valve opening/closing state of the second injector, and the pressure P inside the circulation flow path during the power generation of the fuel cell of the present disclosure at a constant high load current.

In the first embodiment, the timing to open the valve of the second injector coincides with the timing to close the valve of the first injector; however, they may be different.

According to the timeline chart shown in FIG. 5, also in the second embodiment, the valve of the second injector is opened until the valve of the first injector is opened while the valve of the first injector is closed. However, the valve of the second injector is opened after the valve of the first injector is closed, and the valve of the second injector is closed after the valve of the first injector is opened.

In an attempt to control the opening and closing of the valve so that, as in the first embodiment, the timing to open the valve of the first injector and the timing to close the valve of the second injector become the same, if the delay in the response of the first injector is greater than the delay in the response of the second injector, there may be a period of time in which the pressure P inside the circulation flow path is near the lower limit, and both of the valves are closed. Accordingly, the gradient of the pressure drop may increase. As in the second embodiment, if the ECU closes the valve of the second injector after it confirms that the valve of the first injector is opened, an increase in the gradient of the pressure drop is suppressed.

There is also a period of time in which the valve of the second injector is also closed just after the valve of the first injector is closed, and the gradient of the pressure P inside the circulation flow path is increased. However, since the pressure P is sufficiently away from the lower limit PL, there is a low possibility that the pressure P falls below the lower limit PL, and the fuel cell causes fuel gas deficiency. In addition, if the state in which the pressure is too high is prolonged, the electrolyte membrane is liable to be deteriorated. However, in the second embodiment, since the pressure is dropped at once and then slowly dropped, the state in which the pressure is too high can be quickly eliminated, and the deterioration of the electrolyte membrane is suppressed.

Third Embodiment

Figure 6:
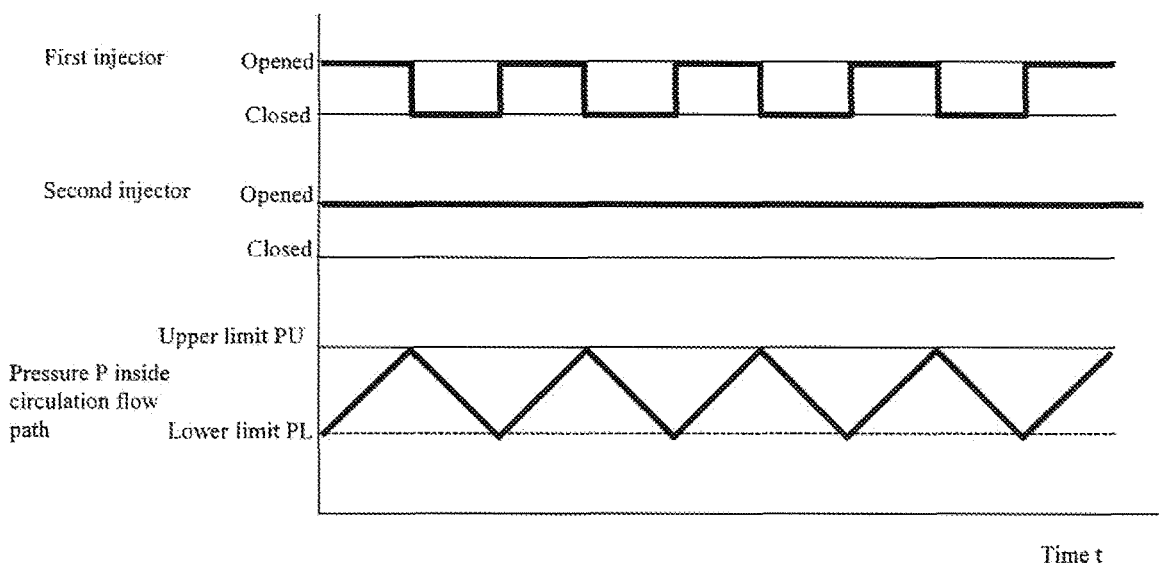
FIG. 6 is a diagram illustrating another example of the relationship between the valve opening/closing state of the first injector, the valve opening/closing state of the second injector, and the pressure P inside the circulation flow path during the power generation of the fuel cell of the present disclosure at a constant high load current.

FIG. 6 is a diagram illustrating another example of the relationship between the valve opening/closing state of the first injector, the valve opening/closing valve state of the second injector, and the pressure P inside the circulation flow path during the power generation of the fuel cell of the present disclosure at a constant high load current.

In the third embodiment, during the power generation of the fuel cell at a high load current, the valve of the second injector is always opened regardless of the valve opening state of the first injector. In the third embodiment, the fuel efficiency is poor as compared with the first embodiment and the second embodiment. However, also in the case of the third embodiment, a rapid decrease in the pressure P inside the circulation flow path while the valve of the first injector is opened and closed, is suppressed by supplying the fuel gas by opening the valve of the second injector while the valve of the first injector is closed.

FIG. 7 is a flowchart illustrating an example of the control of a fuel cell system of the present disclosure.

The controller detects the output current value of the fuel cell detected by the current sensor.

The controller determines whether or not the detected output current value is larger than the predetermined first threshold.

When the controller determines that the output current value is larger than the predetermined first threshold, the controller drives the first injector by duty ratio control, and the controller drives the second injector by duty ratio control to open the valve the second injector at least while the valve the first injector is closed. Then, the controller ends the control.

On the other hand, when the controller determines that the output current value is equal to or less than the predetermined first threshold, the controller determines whether or not the output current value is equal to or less than the predetermined second threshold, which is smaller than the predetermined first threshold.

When the controller determines that the output current value is equal to or less than the predetermined second threshold, the controller always closes the valve of the first injector, and the controller drives the second injector by duty ratio control. Then, the controller ends the control.

On the other hand, when the controller determines that the output current value is larger than the predetermined second threshold, the controller always closes the valve of the second injector, and the controller drives the first injector by duty ratio control. Then, the controller ends the control.

REFERENCE SIGNS LIST

10: Fuel cell (stack)
11: Fuel gas supply flow pass
12: Circulation flow pass
13: Fuel off-gas discharge flow pass
21: Fuel gas supplier (hydrogen tank)
22: Main shutoff valve
23: Pressure control valve
24: First injector
25: Second injector
26: Ejector
27: Gas-liquid separator
28: Vent and discharge valve
29: Pressure sensor
30: Current sensor
40: Controller (ECU)
100: Fuel cell system

The invention claimed is:
1. A fuel cell system,
wherein the fuel cell system comprises:
a fuel cell,
a current sensor for detecting an output current value of the fuel cell,
a fuel gas supplier for supplying fuel gas to the fuel cell,
a circulation flow path connecting a fuel gas outlet of the fuel cell and a fuel gas inlet of the fuel cell to allow fuel off-gas discharged from the fuel gas outlet of the fuel cell to be returned to the fuel gas inlet of the fuel cell as circulation gas,
an ejector disposed in the circulation flow path,
a fuel gas supply flow path connecting the fuel gas supplier and the ejector,
an injector set disposed upstream from the ejector of the fuel gas supply flow path,
a gas-liquid separator disposed upstream from the ejector of the circulation flow path,
a fuel off-gas discharge flow path branching from the gas-liquid separator of the circulation flow path to allow the fuel off-gas to be discharged to the outside of the fuel cell system,
a pressure sensor disposed in the circulation flow path, and
a controller,
wherein the injector set includes a first injector and a second injector in parallel;
wherein an injected fuel gas amount per unit time of the second injector is smaller than that of the first injector;
wherein at least one injector selected from the group consisting of the first injector and the second injector is driven by duty ratio control to maintain a fuel gas pressure to the fuel cell within a predetermined range, in accordance with the output current value;
wherein the controller determines whether or not the output current value is larger than a predetermined first threshold;
wherein, when the controller determines that the output current value is larger than the predetermined first threshold, the controller drives the first injector by duty ratio control, and the controller drives the second injector by duty ratio control to open a valve of the second injector after closing a valve of the first injector and to close the valve of the second injector after opening the valve of the first injector;
wherein, when the controller determines that the output current value is equal to or less than the predetermined first threshold, the controller determines whether or not the output current value is equal to or less than the predetermined second threshold, which is smaller than the predetermined first threshold;
wherein, when the controller determines that the output current value is equal to or less than the predetermined second threshold, the controller always closes the valve of the first injector, and the controller drives the second injector by duty ratio control; and
wherein, when the controller determines that the output current value is larger than the predetermined second threshold, the controller always closes the valve of the second injector, and the controller drives the first injector by duty ratio control.

2. The fuel cell system according to claim 1, wherein, when the controller determines that the output current value is larger than the predetermined first threshold, the controller drives the first injector by duty ratio control, and the controller controls the valve of the second injector to be always opened.

* * * * *